United States Patent
Alkhoudiri

(10) Patent No.: US 11,845,441 B2
(45) Date of Patent: Dec. 19, 2023

(54) SPEED BASED HANDS-ON ALARM SYSTEM FOR A STEERING WHEEL

(71) Applicant: Imam Abdulrahman Bin Faisal University, Dammam (SA)

(72) Inventor: Ahmed Salah M. Alkhoudiri, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 169 days.

(21) Appl. No.: 17/087,173

(22) Filed: Nov. 2, 2020

(65) Prior Publication Data
US 2022/0135046 A1    May 5, 2022

(51) Int. Cl.
*B60W 40/08* (2012.01)
*B60W 40/105* (2012.01)
*B60W 50/14* (2020.01)

(52) U.S. Cl.
CPC .......... *B60W 40/08* (2013.01); *B60W 40/105* (2013.01); *B60W 50/14* (2013.01); *B60W 2040/0818* (2013.01); *B60W 2050/143* (2013.01); *B60W 2050/146* (2013.01); *B60W 2420/24* (2013.01); *B60W 2510/20* (2013.01)

(58) Field of Classification Search
CPC .... B60W 40/08; B60W 40/105; B60W 50/14; B60W 2040/0818; B60W 2050/143; B60W 2050/146; B60W 2420/24; B60W 2510/20
See application file for complete search history.

(56) References Cited

U.S. PATENT DOCUMENTS

| | | | | |
|---|---|---|---|---|
| 7,441,800 | B2 * | 10/2008 | Weber | B62D 1/06 200/61.54 |
| 8,096,946 | B2 * | 1/2012 | Burton | A61M 21/02 600/595 |
| 2005/0189159 | A1 * | 9/2005 | Weber | B62D 1/046 74/552 |

(Continued)

FOREIGN PATENT DOCUMENTS

CN         105291977 B         3/2018

OTHER PUBLICATIONS

Stefanie Essers, et al., "Steering Wheel for Active Driver State Detection", Cover Story Safety Systems, www.autotechreview.com, vol. 5, Issue 7, Jul. 2016, pp. 36-40.

*Primary Examiner* — Nicholas Kiswanto
*Assistant Examiner* — Madison B Emmett
(74) *Attorney, Agent, or Firm* — Oblon, McClelland, Maier & Neustadt, L.L.P.

(57) ABSTRACT

A speed based alarm system to be used in automobiles includes a first touch sensor, a second touch sensor, a processing unit, and a notification alarm. The first touch sensor and the second touch sensor are integrated into a steering wheel body of an automobile to detect the hands of the driver on the steering wheel. The feedback from the first touch sensor and/or the second touch sensor are received at the processing unit along with a vehicle speed, wherein the vehicle speed is retrieved from a vehicle logic board. The processing unit determines if the automobile is at a speed which requires both hands of the driver for better control of the automobile. If the automobile is at a speed that requires both hands of the driver, and only one hand is detected on the steering wheel, the processing unit activates the notification alarm to notify the driver.

4 Claims, 8 Drawing Sheets

(56) References Cited

U.S. PATENT DOCUMENTS

| | | | |
|---|---|---|---|
| 2010/0201545 A1* | 8/2010 | Narea | G08G 1/052 |
| | | | 340/936 |
| 2011/0115617 A1 | 5/2011 | Bennett | |
| 2011/0241850 A1* | 10/2011 | Bosch | B60K 37/06 |
| | | | 74/552 |
| 2011/0246028 A1 | 10/2011 | Lisseman et al. | |
| 2015/0307022 A1* | 10/2015 | Nelson | B62D 1/046 |
| | | | 701/36 |
| 2018/0251066 A1* | 9/2018 | Murata | B60W 30/12 |
| 2018/0326851 A1* | 11/2018 | Kim | G06F 3/0488 |
| 2019/0031124 A1 | 1/2019 | Naboulsi | |
| 2019/0375415 A1* | 12/2019 | Al-Qanaei | G06V 20/597 |
| 2021/0347261 A1* | 11/2021 | Maza | B60K 35/00 |
| 2022/0200594 A1* | 6/2022 | Faber | B62D 1/06 |

* cited by examiner

SPEED BASED HANDS-ON ALARM SYSTEM FOR A STEERING WHEEL

BACKGROUND

Field of the Invention

The present disclosure relates to a system that alerts a driver when no hand or only one hand is in contact with the steering wheel of an automobile, e.g., above a predetermined speed. By utilizing the system and method described in the present disclosure, the driver is prompted to keep both hands on the steering wheel when the automobile is moving which is safer than having one or more hands off the steering wheel.

Description of the Related Art

A significant number of automobile accidents are due to distracted drivers. In general, drivers may be distracted due to factors such as texting and eating while driving which can lead to having minimal control of the automobile. In particular, when a driver uses one hand to text or eat, only one hand is placed on the steering wheel. Thus, the overall degree of control the driver has on the automobile is less than when having both hands on the steering wheel. At lower speeds, a driver may have sufficient control of the automobile with the use of one hand. However, at higher speeds, having both hands on the steering wheel may provide better control of the automobile.

In view of the difficulties and issues that may occur with distracted drivers using existing steering wheel systems, the present disclosure describes a system that limits drivers from holding the steering wheel of an automobile with less than two hands. In particular, the system of the present disclosure prompts the driver to place both hands on the steering wheel when the automobile is moving. Thus, the driver has better control of the automobile and may be less inclined to engage in distracting activities such as eating and texting. As a result of utilizing the system of the present disclosure, accidents may be prevented and loss of lives due to automobile mishaps may also be reduced.

SUMMARY OF THE INVENTION

The present disclosure describes a system that may be used to prompt a driver to maintain both hands on the steering wheel such that the driver has better control of the automobile. As a result of having better control, accidents and other unfavorable circumstances that may occur as a result of accidents may be prevented.

The system of the present disclosure includes a steering wheel body, a first touch sensor, a second touch sensor, a notification alarm, and a processing unit. The first touch sensor and the second touch sensor are integrated into the steering wheel body to detect the hands of the driver. For example, the first sensor may be assigned to detect the right hand of the driver and the second sensor may be assigned to detect the left hand of the driver. The feedback from the first sensor and the second sensor are transferred to the processing unit. As a subsequent step, the processing unit considers the speed of the automobile with the feedback received from the first sensor and the second sensor and triggers the notification alarm. The notification alarm may be an audible alarm and/or a visual alarm.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

All illustrations of the drawings are for the purpose of describing selected embodiments of the present disclosure and are not intended to limit the scope of the present disclosure or accompanying claims.

The present disclosure describes an alarm system that prompts a driver to have both hands on the steering wheel of an automobile. By implementing the system of the present disclosure in automobiles, accidents resulting from losing control of the automobile may be reduced. Furthermore, the number of distracted drivers may also be reduced by utilizing the system described in the present disclosure.

Figure 1A:
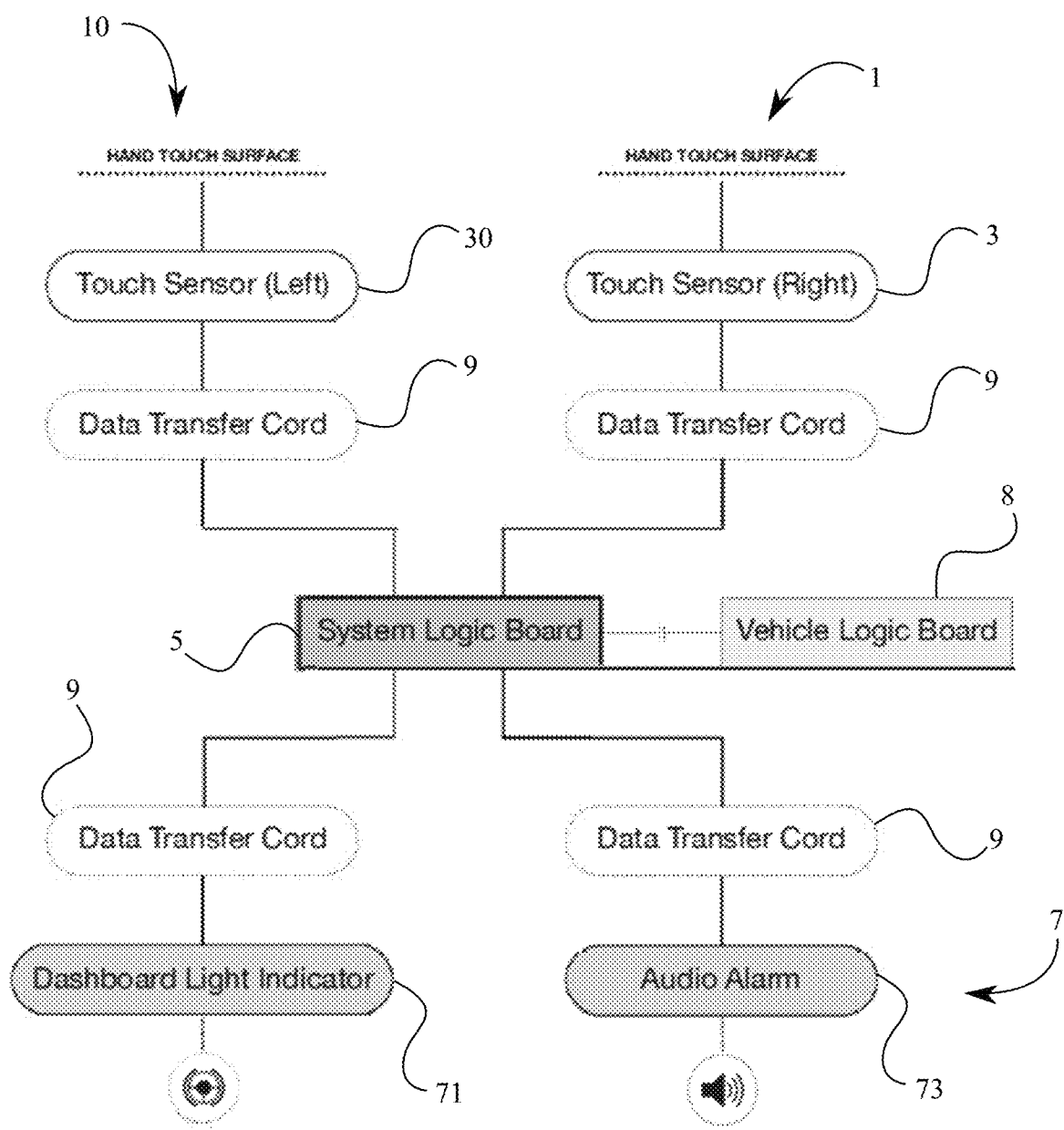
FIG. 1A is an illustration of the system components and the connections between the system components used in the system of the present disclosure.

As seen in FIGS. 1A-3, the speed based hands-on alarm system described in the present disclosure comprises a steering wheel body 6 with a circumferential steering wheel, a first touch sensor 3, a second touch sensor 30, a notification alarm 7, and a processing unit 5. The first touch sensor 3 and the second touch sensor 30 are used to detect the hands of the driver when the automobile is in motion. The notification alarm 7 is used to prompt the driver to hold the steering wheel body 6 with both hands when the automobile is moving above a predetermined speed that is assumed to require both hands for better control of the automobile. As seen in FIG. 1A, the processing unit 5, which is a system logic board, is used to receive feedback from the first touch sensor 3, the second touch sensor 30, and a vehicle logic board 8 of the automobile in order to activate the notification alarm 7. In particular, the processing unit 5 determines when the notification alarm 7 needs to be activated in order to notify the driver.

The type of the circumferential steering wheel used in the system of the present disclosure may vary in different embodiments. In one embodiment, the circumferential steering wheel used in the system described by the present disclosure may be a tilt steering wheel. A tilt steering wheel is connected to an arc allowing the driver to adjust the position of the steering wheel as preferred. The connection between the arc and the steering wheel allows the steering column to remain unaffected by the position of the steering wheel. A ratchet mechanism is generally used in the steering column to adjust the position of the steering wheel.

In another embodiment, the circumferential steering wheel used in the system described by the present disclosure may be a telescope steering wheel. Telescope steering wheels generally allow the driver to adjust the position of the steering wheel within a range of approximately 3-inches.

In another embodiment, the circumferential steering wheel used in the system of the present disclosure may be an adjustable steering column steering wheel. Changes made to the steering wheel with an adjustable steering column is generally smaller than the changes made with a tilt steering wheel. Moreover, instead of a ratchet mechanism, adjustable steering column steering wheels use electric motors and compression locks during the position adjustment process.

In a different embodiment, swing away steering wheels may be used in the system of the present disclosure. Swing away steering wheels are generally used to provide convenience when entering and exiting an automobile by allowing the steering wheel to move by approximately 9-inches.

In another embodiment, the circumferential steering wheel used in the system described by the present disclosure may be a recirculating ball steering wheel. The recirculating ball steering mechanism contains a worm gear inside a block with a threaded hole. The block has gear teeth cut into the outside to engage the sector shaft (also called a sector gear) which moves the Pitman arm. The steering wheel connects to a shaft, which rotates the worm gear inside of the block. Instead of twisting further into the block, the worm gear is fixed so that when it rotates, it moves the block, which transmits the motion through the gear to the Pitman arm, causing the wheels of the automobile to turn.

In a different embodiment, a rack and pinion steering wheel may be used as the circumferential steering wheel used in the system of the present disclosure. A rack and pinion gear set is enclosed in a metal tube, with each end of the rack protruding from the tube. A rod, called a tie rod, connects to each end of the rack. The pinion gear is attached to the steering shaft. When the steering wheel is turned, the gear spins, moving the rack. The tie rod at each end of the rack connects to the steering arm on the spindle. In general, a rack and pinion gear set may convert rotational motion of the steering wheel into linear motion required to turn the wheels of the automobile. The use of a rack and pinion may also reduce the number of gears required for turning the wheels of the automobile.

Genuine leather, cloth or microfiber leather may be used to manufacture the circumferential steering wheel used in the system of the present disclosure. Genuine leather may be used to provide an aesthetically pleasing appearance and as a financially viable option. Cloth may provide a non-slip and sweat absorbing option to the driver. Microfiber leather may be used to provide skid-proof, water resistant, tear resistant, and breathable features to the circumferential steering wheel.

Figure 2:
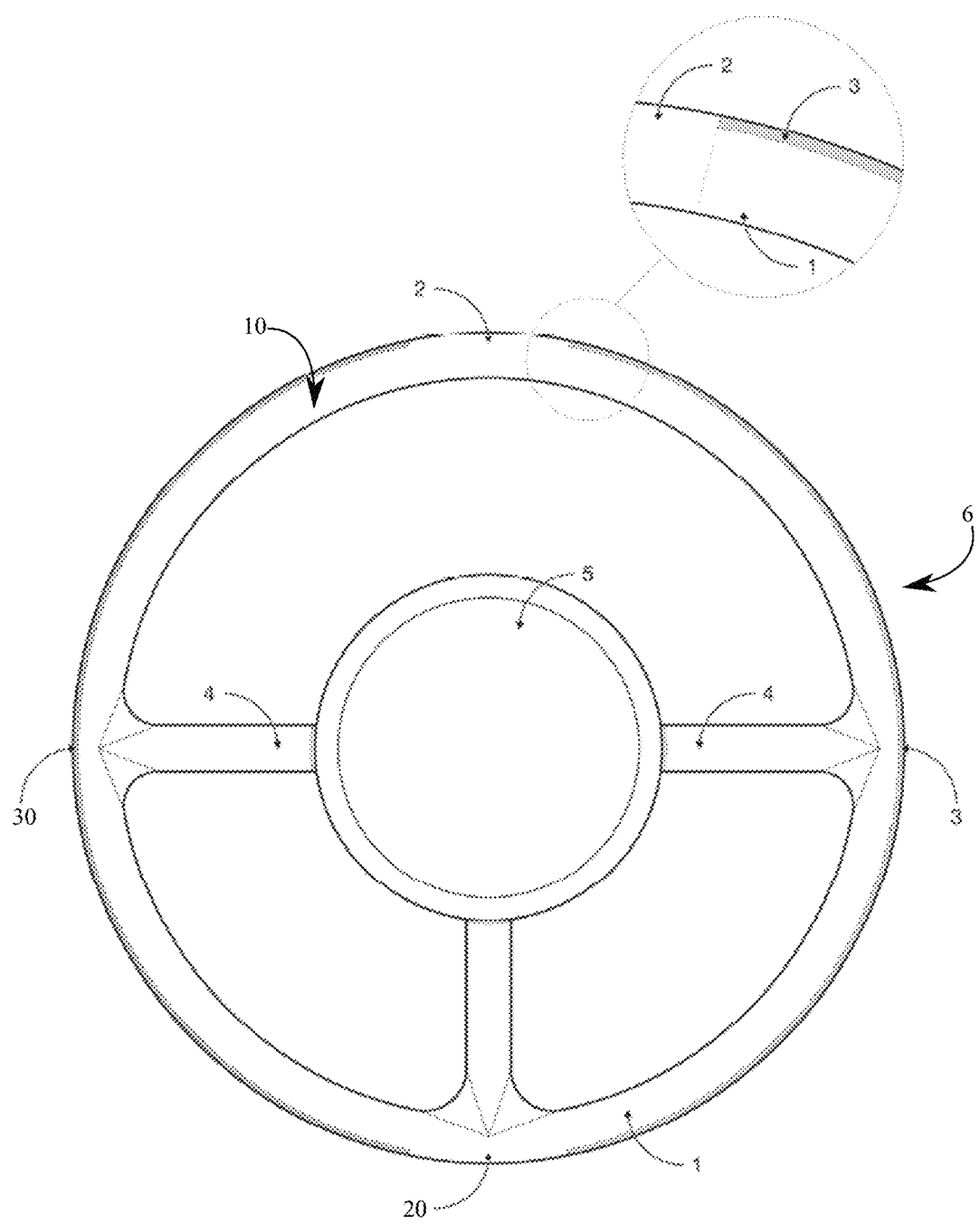
FIG. 2 is a front view of a steering wheel body, wherein the system of the present disclosure is integrated into the steering wheel body.

As seen in FIG. 2, FIG. 3, and FIGS. 5-7, the first touch sensor 3 is integrated into a right hemisphere 1 of the steering wheel body 6. As seen in FIGS. 2-4, FIG. 6, and FIG. 7, the second touch sensor 30 is integrated into a left hemisphere 10 of the steering wheel body 6. Preferably, the first touch sensor 3 and the second touch sensor 30 are positioned along an outermost surface of the steering wheel body 6. Therefore, when a driver holds the steering wheel with both hands, the driver will be in direct contact with both the first touch sensor 3 and the second touch sensor 30. To prevent the driver from simultaneously touching the first touch sensor 3 and the second touch sensor 30 with one hand, the first touch sensor 3 and the second touch sensor 30 are separated by a first steering wheel body section 2 and a second steering wheel body section 20. As seen in FIG. 2, the first steering wheel body section 2 is positioned opposite and across the second steering wheel body section 20. In a preferred embodiment, the first touch sensor 3 and the second touch sensor 30 may be covered with a transparent or opaque polyolefin material such as a thermoelastic material containing polybutadiene.

As seen in FIG. 2, the first touch sensor 3 and the second touch sensor 30 are positioned along an outermost surface of the steering wheel body 6. However, in other embodiments, the first touch sensor 3 and the second touch sensor 30 may be embedded into the steering wheel body 6. Embedment into the steering wheel body 6 provides greater resistance to rubbing and lessens the risk of sensor failure due to damage of the steering wheel body 6.

Figure 3:
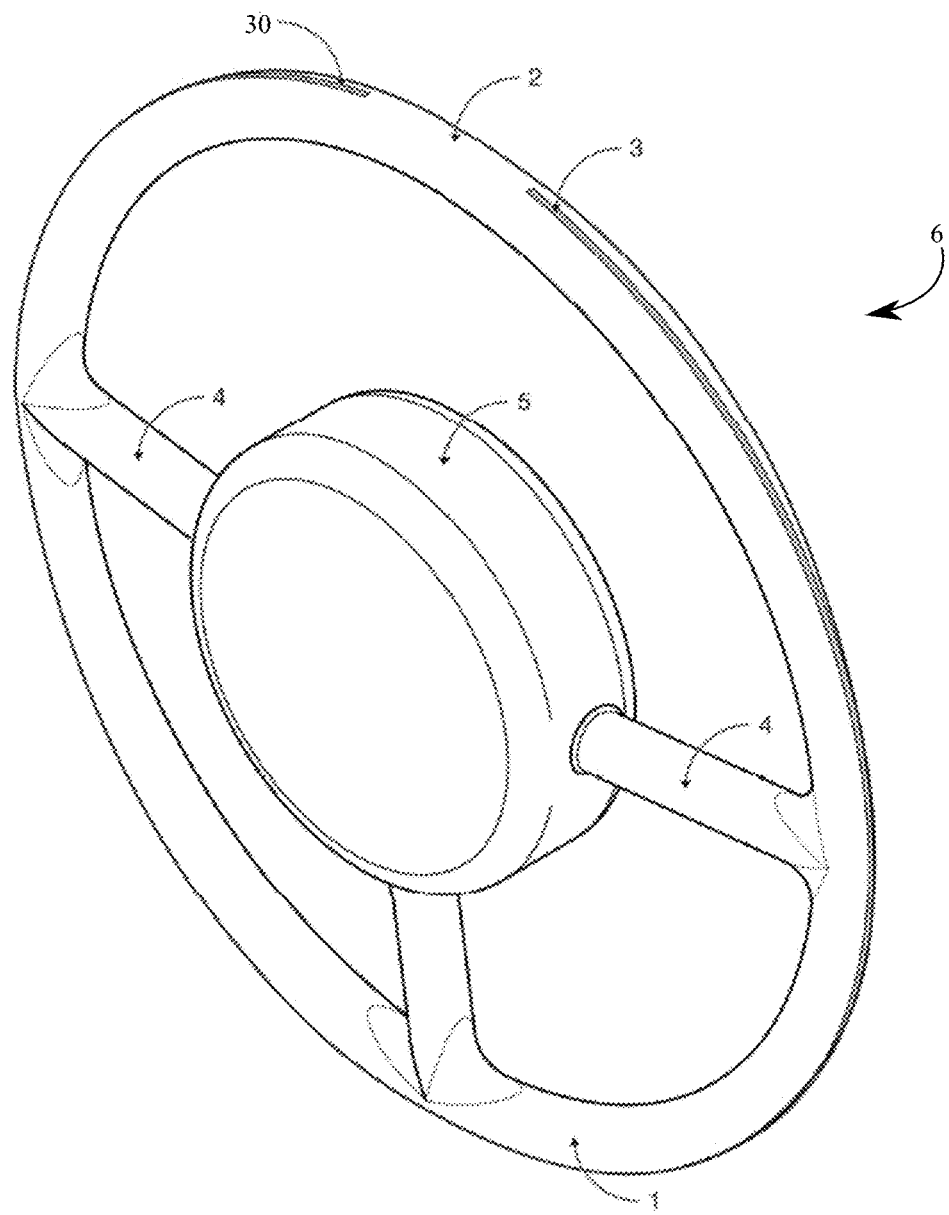
FIG. 3 is a top perspective view of the steering wheel body, wherein the system of the present disclosure is integrated into the steering wheel body.
Figure 4:
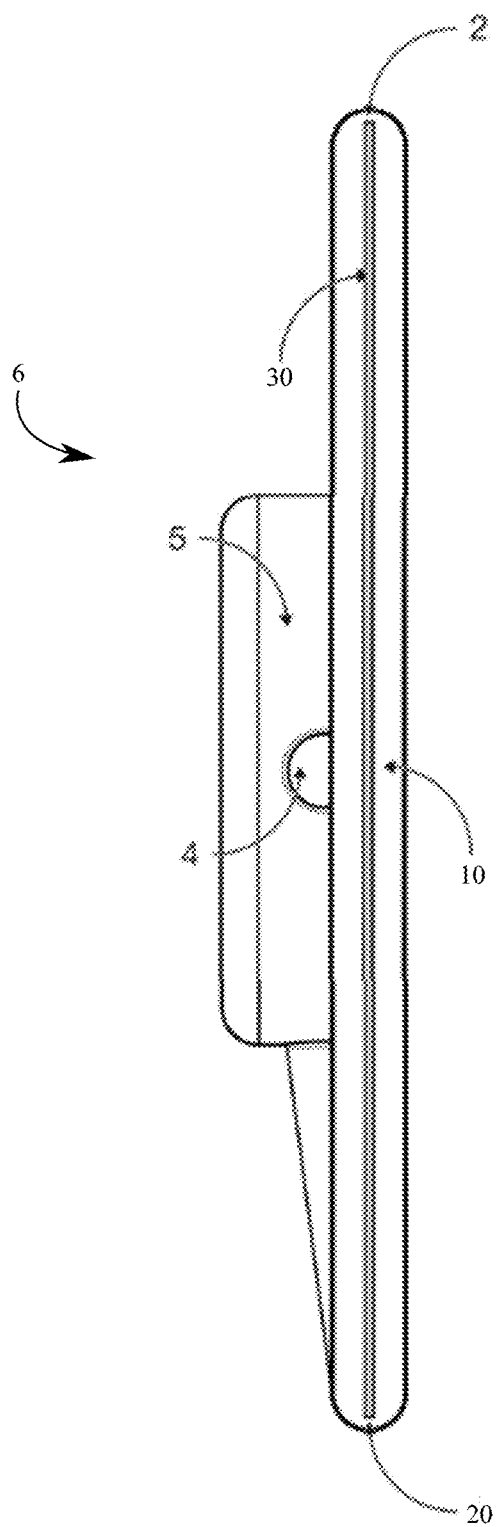
FIG. 4 is a side view of the steering wheel body, wherein the system of the present disclosure is integrated into the steering wheel body.
Figure 5:
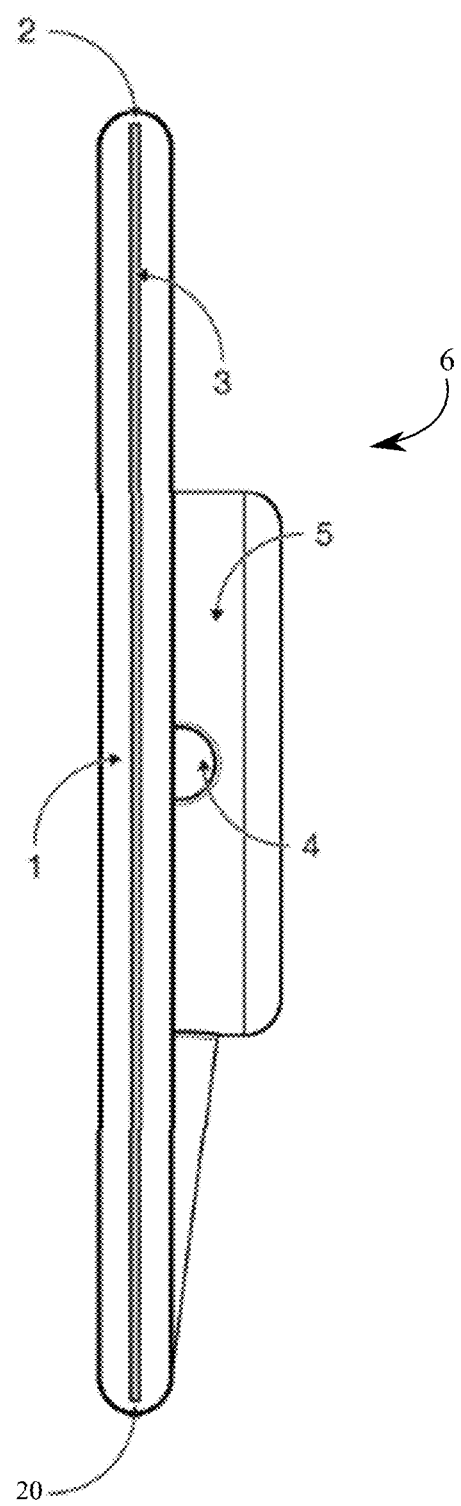
FIG. 5 is another side view of the steering wheel body, wherein the system of the present disclosure is integrated into the steering wheel body.
Figure 6:
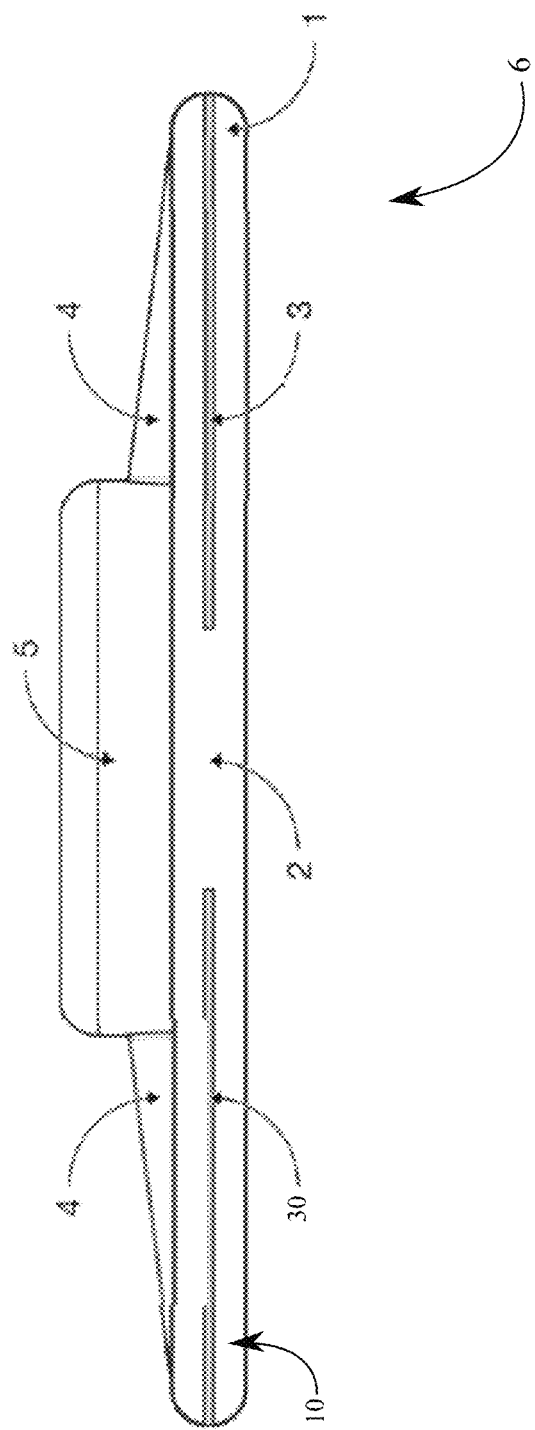
FIG. 6 is a top view of the steering wheel body, wherein the system of the present disclosure is integrated into the steering wheel body.
Figure 7:
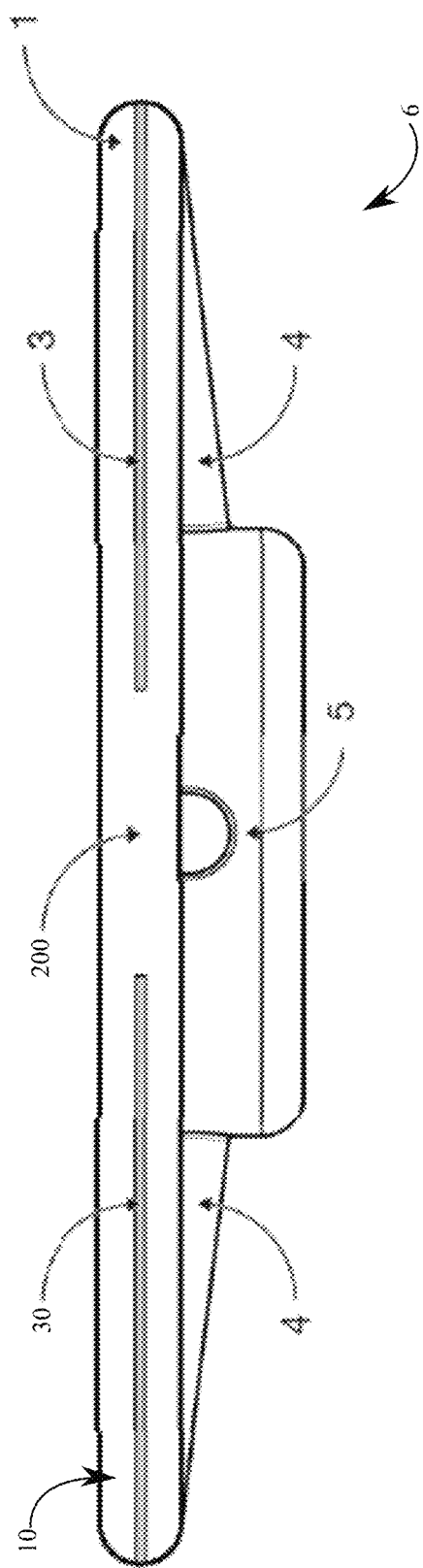
FIG. 7 is a bottom view of the steering wheel body, wherein the system of the present disclosure is integrated into the steering wheel body.

As seen in FIG. 2 and FIG. 3, in a preferred embodiment the first touch sensor 3 and the second touch sensor 30 are positioned on the right hemisphere 1 and the left hemisphere 10 respectively. However, in another embodiment of the present disclosure, one or more pressure sensors may be integrated in different positions along the circumferential steering wheel. Preferably, the pressure sensors are point sensors that measure the pressure at a particular location along the circumferential steering wheel. For example, the pressure sensors may be integrated along an inner circumference of the circumferential steering wheel in one or more positions along a bottom portion of the circumferential steering wheel representing a 90-degree arc on the circumferential steering wheel. Similarly, one or more pressure sensors may be integrated is a location representing a 90-degree arc along a top portion of the circumferential steering wheel. Preferably, the one or more sensors on the top portion will be positioned along an outermost layer or a topmost surface of the circumferential steering wheel. The positioning along the top portion and the bottom portion allows the pressure sensors to detect the hands of a driver who may prefer to hold the circumferential steering wheel at the top portion or the bottom portion.

The first touch sensor 3 and the second touch sensor 30 function similar to a switch. When subjected to touch, the pressure or force generated from the touch results in a closed switch. In contrast, when the pressure or force is released, the first touch sensor 3 and the second touch sensor 30 function as an open switch. The type of sensor used as the first touch sensor 3 and the second touch sensor 30 shown in FIG. 2 and FIG. 3 can be, but is not limited to, a wire resistive sensor, a surface capacitive sensor, a projected capacitive sensor, a surface acoustic wave sensor, an infrared sensor, and a tactile sensor.

If a wire resistive sensor is used as the first touch sensor 3 and the second touch sensor 30, upon touch from the driver, two metallic layers make contact resulting in a flow of current. Wire resistive sensors can further be classified as 4-wire, 5-wire, or 8-wire types. 4-wire resistive touch sensors are cost effective. 5-wire resistive touch sensors are durable, and similar to 4-wire sensors except that all the electrodes in the 5-wire type are on a bottom layer. A top layer in 5-wire sensors act as a voltage measuring probe. 5-wire resistive touch sensors allow higher number of actuations. In 8-wire resistive touch sensors, each edge of the sensor provides a sensing line. The sensing lines act as a stable voltage gradient for the touch controller. The actual baseline voltage levels at the touch area are reported by the sensing lines to the controller.

If surface capacitive sensors are used as the first touch sensor 3 and the second touch sensor 30, the surface capacitive sensors are activated due to the static electrical capacity of the human body. In general, the simplest form of a surface capacitive sensor can be made of two conductors separated by an insulator such that the capacitance is directly proportional to the area and inversely proportional to the distance between the two conductors. In surface capacitive touch sensors, the electrode represents one of the plates of the capacitor. The second plate is represented by two objects: one is the environment of the sensor electrode which forms parasitic capacitor, $C_O$, and the other is a conductive object like human finger which forms touch capacitor, $C_T$. The sensor electrode is connected to a measurement circuit and the capacitance is measured periodically. The output capacitance will increase if a conductive object touches or approaches the sensor electrode. The measurement circuit will detect the change in the capacitance and converts it into a trigger signal.

Projective capacitive touch technology is a variant of capacitive technology where sensitivity to touch, accuracy, resolution and speed of touch have been improved by the use of artificial intelligence. Such intelligent processing enables finger sensing to be projected, accurately and reliably.

As seen in FIG. 2 and FIG. 3 the first touch sensor 3 and the second touch sensor 30, which appear as thin strips, are positioned adjacent the outermost surface of the steering wheel body 6. When surface capacitive sensors are used as the first touch sensor 3 and the second touch sensor 30, the surface capacitive sensors may be wrapped around a circumference of the steering wheel body. Preferably, each wrap of the surface capacitive sensors around the circumference of the steering wheel body is spaced by a distance of no more than 1×a width of the surface capacitive sensor, 1.5×the width of the surface capacitive sensor, 2×the width of the surface capacitive sensor, 3×the width of the surface capacitive sensor, or 5×the width of the surface capacitive sensor. The surface capacitive sensor may have a width and/or thickness ranging from 0.1 to 5 millimeters (mm), preferably 0.5 to 2.5 mm or 1 to 2 mm. Spiral wrapping the surface capacitive sensors is preferred since the hands of drivers with varying driving habits can be detected. For example, some drivers prefer to rest their hands on an outside surface of the steering wheel body along a top hemisphere. Other drivers prefer to rest their hands along an inside surface of the steering wheel body along a bottom hemisphere. A circumferentially wrapped surface capacitive sensor permits detection of hand placement under different driving habits.

In an embodiment of the system of the present disclosure, surface acoustic wave (SAW) sensors may be used as the first touch sensor 3 and the second touch sensor 30. SAW sensors rely on the modulation of surface acoustic waves to sense a physical phenomenon. The sensor transduces an input electrical signal into a mechanical wave which, unlike an electrical signal, can be easily influenced by physical phenomena. The device then transduces the mechanical wave back into an electrical signal. Changes in amplitude, phase, frequency, or time-delay between the input and output electrical signals can be used to measure the presence of the desired phenomenon.

In an embodiment of the system of the present disclosure, infrared sensors may be used as the first touch sensor 3 and the second touch sensor 30. Infrared sensors detect a beam being broken or changed when an object is touched. More specifically, the basic principal of an infrared sensor is to use an obstacle as a detector to transmit an infrared signal, wherein the infrared signal reflects back from the surface of an object. The reflected signal is received at the infrared receiver.

Figure 1B:
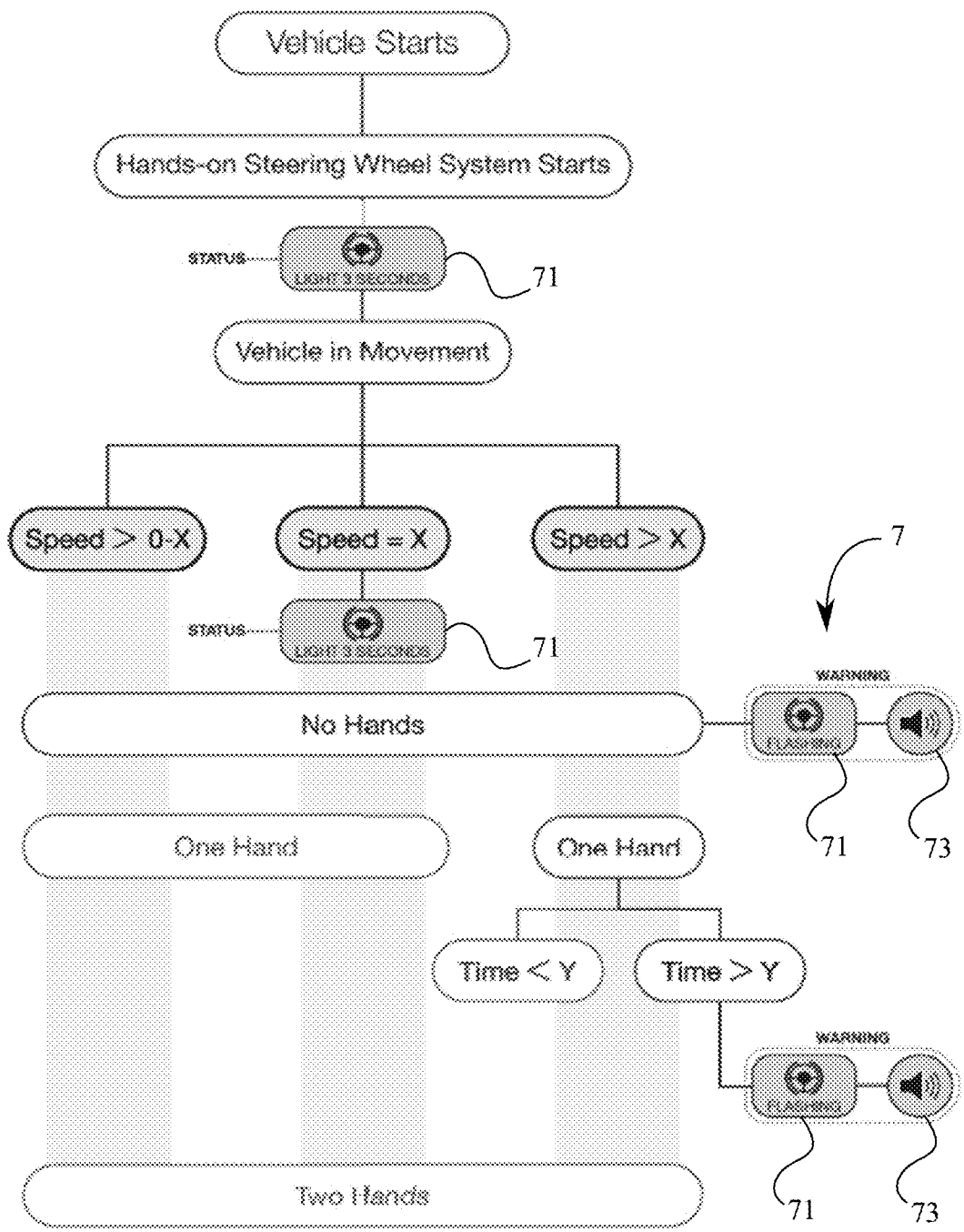
FIG. 1B is an illustration of the process flow of the system of the present disclosure.

In an embodiment of the system of the present disclosure, tactile sensors may be used as the first touch sensor 3 and the second touch sensor 30, which are shown in FIG. 2, such that the notification alarm 7, shown in FIG. 1B, is triggered according to the haptic feedback received from the tactile sensors. In general, the tactile sensors may be used to detect the amount of force the driver applies on the steering wheel body 6. If the amount of force applied on the tactile sensors is below a threshold force, the notification alarm 7 may be triggered. The use of tactile sensors is especially important to prevent the driver from being in contact with the steering wheel body 6 without having adequate control of the automobile. For example, the driver may be in contact with the steering wheel body 6 but may have a loose grip on the steering wheel body, wherein the loose grip may not allow the driver to have adequate control of the automobile. In such instances, the tactile sensors may be beneficial in notifying the driver in a timely manner.

As described earlier and illustrated in FIG. 1A, the processing unit 5 receives feedback from the first touch sensor 3, the second touch sensor 30, and vehicle status information from the vehicle logic board 8 of the automobile such that the notification alarm 7 can be activated and the driver of the automobile is prompted to hold the steering wheel body 6 with both hands.

The first touch sensor 3 and the second touch sensor 30 are electronically coupled with the processing unit 5 to communicate a plurality of touch sensor information to the processing unit 5. To do so, the processing unit 5 includes circuitry with program instructions to receive a plurality of touch sensor information from the first touch sensor 3 and the second touch sensor 30.

On the other hand, the vehicle logic board 8 communicates a vehicle speed to the processing unit 5. To retrieve vehicle status information including the vehicle speed, the processing unit 5 is communicably coupled with the vehicle logic board 8. In particular, the processing unit 5 includes circuitry with program instructions to receive vehicle status information including the vehicle speed. The circuitry of the processing unit 5 allows the processing unit 5 to determine a safety status for the automobile based upon the vehicle status information and the plurality of touch sensor information, and issue an activation signal to the notification alarm 7 to be activated if the safety status crosses a warning threshold. More specifically, the warning threshold defines a speed of the automobile which requires the driver to have both hands on the steering wheel body 6. To transfer the activation signal from the processing unit 5 to the notification alarm 7, the processing unit 5 is electronically connected to the notification alarm 7.

Since the warning threshold defines a speed at which the driver needs to maintain both hands on the steering wheel, when only one hand is detected on the steering wheel body 6 and the vehicle speed is greater than a threshold speed, the program instructions within the circuitry of the processing unit 5 sends the activation signal to the notification alarm 7 after a predetermined wait time determined by the warning threshold. More specifically, the predetermined wait time is a time period in which the driver is allowed to have one hand on the steering wheel body 6 when the vehicle speed is greater than the threshold speed for actions such as shifting gears. In general, the predetermined time period is within a range of 5 seconds (s)-15 s, 8 s-12 s, with a preferable time period of approximately 10 s. Moreover, the threshold speed is the speed at which the driver needs to have both hands on the steering wheel. The threshold speed may be within a range of 50 kilometers per hour (km/h) (31.06 miles per hour (mph))-75 km/h (56.60 mph), 55 km/h (34.17 mph)-65 km/h (40.39 mph), with a preferable threshold speed of approximately 60 km/h (37.28 mph).

Preferably, the notification alarm 7 provides a visual notification and also an audio notification. To provide the visual notification, the notification alarm 7 comprises an indicator light 71, which is preferably positioned on a highly visible location such as the dashboard. To provide the audio notification, the notification alarm 7 comprises an audible alarm 73, which is preferably positioned in close vicinity to the driver of the automobile. To be activated upon receiving the activation signal from the processing unit 5, both the indicator light 71 and the audible alarm 73 are electronically connected to the processing unit 5.

Therefore, if the plurality of touch sensor information is received only from the first touch sensor 3, wherein the driver is not in contact with the second touch sensor 30, and the vehicle speed is greater than the threshold speed, the indicator light 71 and the audible alarm 73 of the notification alarm 7 are activated. Furthermore, if the plurality of touch sensor information is received only from the second touch sensor 30, wherein the driver is not in contact with the first touch sensor 3, and the vehicle speed is greater than the threshold speed, the indicator light 71 and the audible alarm 73 are activated. Additionally, if the plurality of touch sensor information is not received from either the first touch sensor 3 or the second touch sensor 30, the processing unit 5 issues the signal to the notification alarm 7 such that the indicator light 71 and the audible alarm 73 are activated.

In addition to illuminating the indicator light 71 and activating the audible alarm 73, shown in FIG. 1B, in a different embodiment a vibration mechanism may be integrated into the steering wheel body 6 shown in FIG. 2. Therefore, when less than two hands is detected on the steering wheel body 6 the vibration mechanism may be triggered so that the steering wheel body 6 is vibrated. To do so, the vibration mechanism is preferably operatively coupled with the processing unit 5 shown in FIG. 1A. The vibration mechanism may be used in conjunction with the indicator light 71 and the audible alarm 73 or as an independent notification system. Preferably, the vibration mechanism may be implemented when the first touch sensor 3 and the second touch sensor 30 are tactile sensors in an embodiment of the present disclosure. In another embodiment, the vibration mechanism may be integrated into the seat of the driver. Thus, when the vibration mechanism is activated, a vibrating motion will notify the driver.

In another embodiment, the notification alarm 7 may be programmed to be triggered when the hands of the driver are not in an optimal position to control the automobile. For example, the first touch sensor may comprise a first set of pressure sensors and the second touch sensor may comprise a second set of pressure sensors. Each of the first set of pressure sensors and each of the second set of pressure sensors will be equidistantly positioned along the right hemisphere 1 and the left hemisphere 10 which are shown in FIG. 2. In particular, the first set of pressure sensors and the second set of pressure sensors will be symmetrically positioned opposite to each other and across the circumferential steering wheel. Thus, by determining the exact positioning on the right hand and the left hand, and using the feedback received from the vehicle logic board 8, shown in FIG. 1A, the processing unit 5 may determine if the hands of the driver are in an optimal position to control the automobile. If the hands are not in an optimal position, the notification alarm 7 may be activated.

As illustrated in FIG. 1B, in a preferred embodiment, if the plurality of touch sensor information is received only from the first touch sensor 3 or the second touch sensor 30 and the vehicle speed is greater than the threshold speed, the indicator light 71 will be illuminated as a flashing light. On the other hand, when the vehicle speed matches the threshold speed, the indicator light 71 will be continuously illuminated to notify the driver that the vehicle speed is at the maximum speed where only one hand can be used on the steering wheel body 6. Preferably, the indicator light 71 will be continuously illuminated for a time period within range of 1 second-10 seconds (s), 2 s-5 s, with a preferable time period of 3 s. Additionally, when the automobile starts to move from a stationary starting point, the indicator light 71 may also be used to notify the driver that the system is activated.

In one embodiment, a light emitting diode (LED) may be used as the indicator light 71 of the notification alarm 7. LED is a semiconductor light source that emits light when current flows through. Electrons in the semiconductor recombine with electron holes, releasing energy in the form of photons. The color of the light (corresponding to the energy of the photons) is determined by the energy required for electrons to cross the band gap of the semiconductor. LEDs offer extended service life, extreme vibration resistance, and can permit considerably shallower packaging compared to most bulb-type assemblies.

In one embodiment, the indicator light 71 can be an incandescent lamp, wherein the incandescent lamp is an electric light with a wire filament heated to a high temperature. The high temperature results in the wire filament glowing with visible light. The wire filament is generally protected from oxidation with a glass or fused quartz bulb that is filled with inert gas or a vacuum.

In a different embodiment, a high intensity discharge (HID) lamp may be used as the indicator light 71. HID lamps are a type of electrical gas-discharge lamp which produces light by means of an electric arc between tungsten electrodes housed inside a translucent or transparent fused quartz or fused alumina arc tube. The arc tube is generally filled with noble gas and often contains metal or metal salts.

In a different embodiment, a neon lamp may be used as the indicator light 71. A neon lamp typically includes a small glass capsule that contains a mixture of neon and other gases at a low pressure and two electrodes (an anode and a cathode). When a sufficient voltage is applied and sufficient current is supplied between the electrodes, the lamp produces an orange glow discharge.

As described earlier, the first touch sensor 3 and the second touch sensor 30 are electronically coupled with the processing unit 5 to transfer the plurality of touch sensor information. Preferably, a set of data transfer cables 9 integrated into the steering wheel body 6 is used to transfer the plurality of touch sensor information from the first touch sensor 3 and/or the second touch sensor 30. The set of data transfer cables 9 is preferably positioned within a set of spokes 4 of the steering wheel body 6, wherein the set of spokes 4 is used to connect outer ring of the steering wheel body 6 to the steering wheel column. The number of spokes used as the set of spokes 4 in the system of the present disclosure can be, but is not limited, to three or four spokes.

Terminology used herein is for the purpose of describing particular embodiments only and is not intended to be limiting of the invention.

As used herein, the singular forms "a", "an" and "the" are intended to include the plural forms as well, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "and/or" includes any and all combinations of one or more of the associated listed items and may be abbreviated as "/".

As used herein in the specification and claims, including as used in the examples and unless otherwise expressly specified, all numbers may be read as if prefaced by the word "substantially", "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), +/−20% of the stated value (or range of values), etc. Any numerical range recited herein is intended to include all subranges subsumed therein.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it also describes subranges for Parameter X including 1-9, 1-8, 1-7, 2-9, 2-8, 2-7, 3-9, 3-8, 3-7, 2-8, 3-7, 4-6, or 7-10, 8-10 or 9-10 as mere examples. A range encompasses its endpoints as well as values inside of an endpoint, for example, the range 0-5 includes 0, >0, 1, 2, 3, 4, <5 and 5.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

All publications and patent applications mentioned in this specification are herein incorporated by reference in their entirety to the same extent as if each individual publication or patent application was specifically and individually indicated to be incorporated by reference, especially referenced is disclosure appearing in the same sentence, paragraph, page or section of the specification in which the incorporation by reference appears.

Obviously, numerous modifications and variations of the present invention are possible in light of the above teachings. It is therefore to be understood that within the scope of the appended claims, the invention may be practiced otherwise than as specifically described herein.

The invention claimed is:

1. A speed based hands-on alarm system for a steering wheel, comprising:
    a steering wheel body with a circumferential steering wheel;
    spokes connecting the steering wheel body to a steering wheel column;
    a first touch sensor being integrated into a right hemisphere of the steering wheel body and a second touch sensor being integrated into a left hemisphere of the steering wheel body, the first touch sensor covering at least 90 degrees of the right hemisphere of the steering wheel body and the second touch sensor covering at least 90 degrees of the left hemisphere of the steering wheel body, the first touch sensor and the second touch sensor being embedded into the steering wheel body, and the first touch sensor and the second touch sensor being tactile sensors;
    a notification alarm including an indicator light provided on a dashboard of a vehicle and an audible alarm positioned inside the vehicle;
    a processing unit; and
    a set of data transfer cables electronically coupling the first touch sensor and the second touch sensor, the set of data transfer cables being positioned within the spokes and being integrated into the steering wheel body,
    wherein the processing unit is communicably coupled with a vehicle logic board to retrieve vehicle status information;
    wherein the processing unit includes circuitry with program instructions to:
        receive vehicle status information including a vehicle speed,
        receive touch sensor information from the first touch sensor and the second touch sensor,
        determine a safety status based on the vehicle status information and the touch sensor information, and
        issue an activation signal to the notification alarm to activate the indicator light as a flashing light and the audible alarm of the notification alarm when the safety status crosses a warning threshold, the warning threshold including
            the touch sensor information is received from only one of the first touch sensor and the second touch sensor after a predetermined wait time and the vehicle speed is greater than a threshold speed, the touch sensor information is not received from the first touch sensor and the second touch sensor, an amount of force received from the first touch sensor and the second touch sensor is below a predetermined force amount, and the touch sensor information received from the first touch sensor and the second touch sensor indicate that hands of a driver are not in a predetermined optimal position, wherein the first touch sensor is separated from the second touch sensor by a first steering wheel body section and a second steering wheel body section, the first steering wheel body section being positioned opposite the second steering wheel body section, and one of the spokes being directly connected to the second steering wheel body section, wherein the notification alarm is electronically connected to the processing unit, wherein the indicator light of the notification alarm is continuously illuminated for a predetermined time period when the vehicle moves from a stationary position and when the vehicle speed is at the threshold speed, and wherein the notification alarm includes a vibration mechanism integrated into the steering wheel body and a seat of a driver, the vibration mechanism being triggered when the safety status crosses the warning threshold.

2. The speed based hands-on alarm system for a steering wheel of claim 1, wherein the indicator light is continuously illuminated for a time period within a range of 2 seconds (s)-5s when the vehicle speed is at the threshold speed.

3. The speed based hands-on alarm system for a steering wheel of claim 1, wherein the threshold speed is within a range of 50 kilometers per hour (km/h)-75 km/h.

4. The speed based hands-on alarm system for a steering wheel of claim 1, wherein the predetermined wait time is within a range of 5 seconds (s)-15s.

* * * * *